(12) United States Patent
Justin et al.

(10) Patent No.: US 11,240,438 B1
(45) Date of Patent: Feb. 1, 2022

(54) INFORMATION HANDLING SYSTEM CAMERA WITH AUTOMATED TILT, PAN AND SHUTTER FUNCTIONALITY

(71) Applicant: Dell Products L.P., Round Rock, TX (US)

(72) Inventors: Wong Hin Loong Justin, Singapore (SG); Karthikeyan Krishnakumar, Austin, TX (US); Gerald R. Pelissier, Mendham, NJ (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/315,918

(22) Filed: May 10, 2021

(51) Int. Cl.
*H04N 5/232* (2006.01)
*H04N 5/225* (2006.01)
*G03B 17/56* (2021.01)
*G03B 17/02* (2021.01)

(52) U.S. Cl.
CPC ......... *H04N 5/23299* (2018.08); *G03B 17/02* (2013.01); *G03B 17/566* (2013.01); *H04N 5/2252* (2013.01); *H04N 5/23293* (2013.01)

(58) Field of Classification Search
CPC ............ H04N 5/23299; H04N 5/2252; H04N 5/23293; H04N 5/23206; H04N 5/23222; H04N 5/23258; H04N 5/23238; H04N 5/23296; H04N 5/23274; H04N 5/23216; H04N 5/232945; H04N 5/232935; H04N 2201/0015; H04N 2201/3253; H04N 7/18; G03B 17/02; G03B 17/566; G03B 17/561; G02B 27/646; B66F 11/048; F16M 11/18; F16M 11/10; F16M 11/2014

USPC ..................................................... 348/207.99
See application file for complete search history.

(56) References Cited

U.S. PATENT DOCUMENTS

| 7,548,255 | B2 * | 6/2009 | Bear ................. | H04N 5/23203 348/14.01 |
| 7,581,893 | B2 * | 9/2009 | Miramontes ........... | G03B 17/00 396/448 |
| 8,200,078 | B2 | 6/2012 | Dumm | |
| 8,860,780 | B1 | 10/2014 | Davey et al. | |
| 8,899,849 | B2 * | 12/2014 | Wada .................. | G03B 11/043 396/427 |
| 8,938,161 | B2 | 1/2015 | Webb et al. | |

(Continued)

OTHER PUBLICATIONS

Xiaomi Global Community, "Mi Home (Mijia) 360 degrees Home Camera White: Full Specifications, photo," downloaded from Xiaomi-mi.com on May 10, 2021, 3 pages.

(Continued)

*Primary Examiner* — Pritham D Prabhakher
(74) *Attorney, Agent, or Firm* — Zagorin Cave LLP; Robert W. Holland (57) ABSTRACT

An information handling system camera manages tilt and pan in an automated manner to direct the camera field of view. A shutter slides behind a camera cover to align a shutter opening with a cover opening. Additional sliding of the cover translates to a tilt of the camera from a full down axis to a full up axis. For example, a cam surface formed in the shutter engages the camera for tilt with a spring bias of the camera against the cam. Rotation of the camera housing about a bracket pivot gear is provided through sliding motion of a pan bar within the camera housing.

20 Claims, 8 Drawing Sheets

(56) References Cited

U.S. PATENT DOCUMENTS

| | | | |
|---|---|---|---|
| 9,016,962 B1* | 4/2015 | Yamamoto | G08B 13/19619 |
| | | | 396/427 |
| 9,202,356 B1* | 12/2015 | Kobayashi | H04N 5/2254 |
| D761,343 S | 7/2016 | Schmidt et al. | |
| 10,015,296 B1* | 7/2018 | Haymond | H04M 1/0252 |
| 10,250,783 B2* | 4/2019 | Germe | F16M 11/041 |
| 10,268,103 B2* | 4/2019 | Wada | G03B 11/045 |
| 10,560,621 B2 | 2/2020 | Rao et al. | |
| 10,761,404 B2* | 9/2020 | Leimer | G03B 11/041 |
| 11,005,982 B2* | 5/2021 | Kinouchi | G03B 17/04 |
| 2005/0068423 A1* | 3/2005 | Bear | H04N 5/23203 |
| | | | 348/207.99 |
| 2013/0223834 A1* | 8/2013 | Jikihara | G03B 11/045 |
| | | | 396/448 |
| 2014/0248045 A1* | 9/2014 | Wada | G03B 11/043 |
| | | | 396/427 |
| 2016/0065820 A1* | 3/2016 | Yamamoto | H04N 5/2353 |
| | | | 348/151 |
| 2019/0179212 A1* | 6/2019 | Leimer | G03B 11/043 |
| 2019/0258137 A1* | 8/2019 | VanTassell | H04N 5/2254 |
| 2019/0260863 A1* | 8/2019 | Kinouchi | H04M 1/04 |
| 2020/0344340 A1* | 10/2020 | Kinouchi | H04M 1/0272 |
| 2021/0234949 A1* | 7/2021 | Kinouchi | H04M 1/0272 |

OTHER PUBLICATIONS

Wyze Cam Pan, "Wyze Cam Pan—take it for a spin," downloaded from http://wyze.com/wyze-cam-pan.html on May 10, 2021, 7 pages.

* cited by examiner

INFORMATION HANDLING SYSTEM CAMERA WITH AUTOMATED TILT, PAN AND SHUTTER FUNCTIONALITY

BACKGROUND OF THE INVENTION

Field of the Invention

The present invention relates in general to the field of portable information handling systems, and more particularly to an information handling system dual pivot hinge signal path.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems often interact with peripheral devices, such as peripheral keyboards, mice and cameras. Peripheral cameras offer a number of advantages over integrated cameras found in portable information handling systems. As one example, peripheral cameras may be physically moved relative to a display to align their field of view with an end user position. In some instances, peripheral cameras rest on a desktop surface so that the end user can manually pan the camera field of view. In addition, the camera rests on a stand that includes a mechanical linkage to support camera tilt. In other instances, peripheral cameras couple to a display with a bracket so that an end user viewing the display looks toward the camera. Generally, the bracket includes a mechanical linkage to allow the end user to manually manipulate the orientation of the camera field of view. In some instances, field of view may be adjusted by manipulating the captured image to a desired portion, such as by cropping the image to provide a tilt function.

One difficulty with both integrated and peripheral cameras is that a malicious actor can potentially gain access to a camera to capture unauthorized visual images that invade the end user's privacy. To help avoid such intrusions, cameras can include a shutter that blocks the camera field of view when the camera is not in use. In many cases, the shutter is an opaque material that slides over the camera when not in use. Although a manual shutter enhances security by blocking the camera field of view, the end user has to remember to close the shutter when the camera is not in use. Further, manual manipulation of a shutter and of tilt and pan before using a camera is often inconvenient for an end user. In addition, manual shutters and mechanical linkages for managing a camera field of view detracts from the appearance of the camera due to the exposed components. Generally, integrated mechanical shutter, pan and tilt mechanisms in a camera housing tends to consume housing footprint resulting in a larger camera structure.

SUMMARY OF THE INVENTION

Therefore, a need has arisen for a system and method which integrates camera automated tilt, pan and shutter functionality into a camera interior.

In accordance with the present invention, a system and method are provided which substantially reduce the disadvantages and problems associated with previous methods and systems that direct a camera field of view. A camera integrates a shutter that slides relative to a camera opening with an integrated shutter translation mechanism to selectively close and open a camera module field of view. The shutter translation mechanism interfaces with the camera module to adjust camera tilt by movement of the shutter. An internal housing rotation mechanism supports camera pan across different viewing areas.

More specifically, an information handling system processes information with processing components disposed in a housing, such as a processor and memory, and presents the information as visual images at a display. A camera interfaces with the processing components to communicate captured visual images for presentation at the display, such as to support a videoconference with the camera coupled to the display by a bracket. A camera module disposed in a camera housing captures visual images through a camera opening at a front cover. A shutter disposed in the camera housing slides relative to the front cover to selectively block the front cover opening and unblock the front cover opening with alignment of a shutter opening. Sliding movement of the shutter translates from the shutter to adjust the tilt of the camera module. For instance, a shutter translation mechanism rotates a thread member to move a coupling device coupled to the shutter, thereby sliding the shutter. A cam on the shutter engages a swivel pin once the camera field of view is exposed through the shutter opening so that additional sliding motion of the shutter changes tilt of the camera module. A housing rotation mechanism interacts with a pivot gear to rotate the camera housing relative to its supporting bracket. For example, a threaded member rotates to move a coupling device that slides a pan bar having gears engaged with a pivot gear coupled to the bracket. The pan bar sliding motion translates to rotation of the camera housing relative to the bracket.

The present invention provides a number of important technical advantages. One example of an important technical advantage is that a camera supports tilt, pan and shutter functionality with mechanisms integrated in the camera housing and without exposing to view moving mechanical components. Accomplishing physical readjustment of a camera field of view allows full camera resolution to be available for capturing a visual image, such as an end user in a videoconference, unlike virtual tilt and pan functions that crop to a desired portion of a captured visual image. Automated shutter actuation helps to secure the end user system from unauthorized camera control and reduces system complexity and cost by tying shutter movement with camera tilt actuation.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

An information handling system camera supports automated tilt, pan and shutter functionality. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
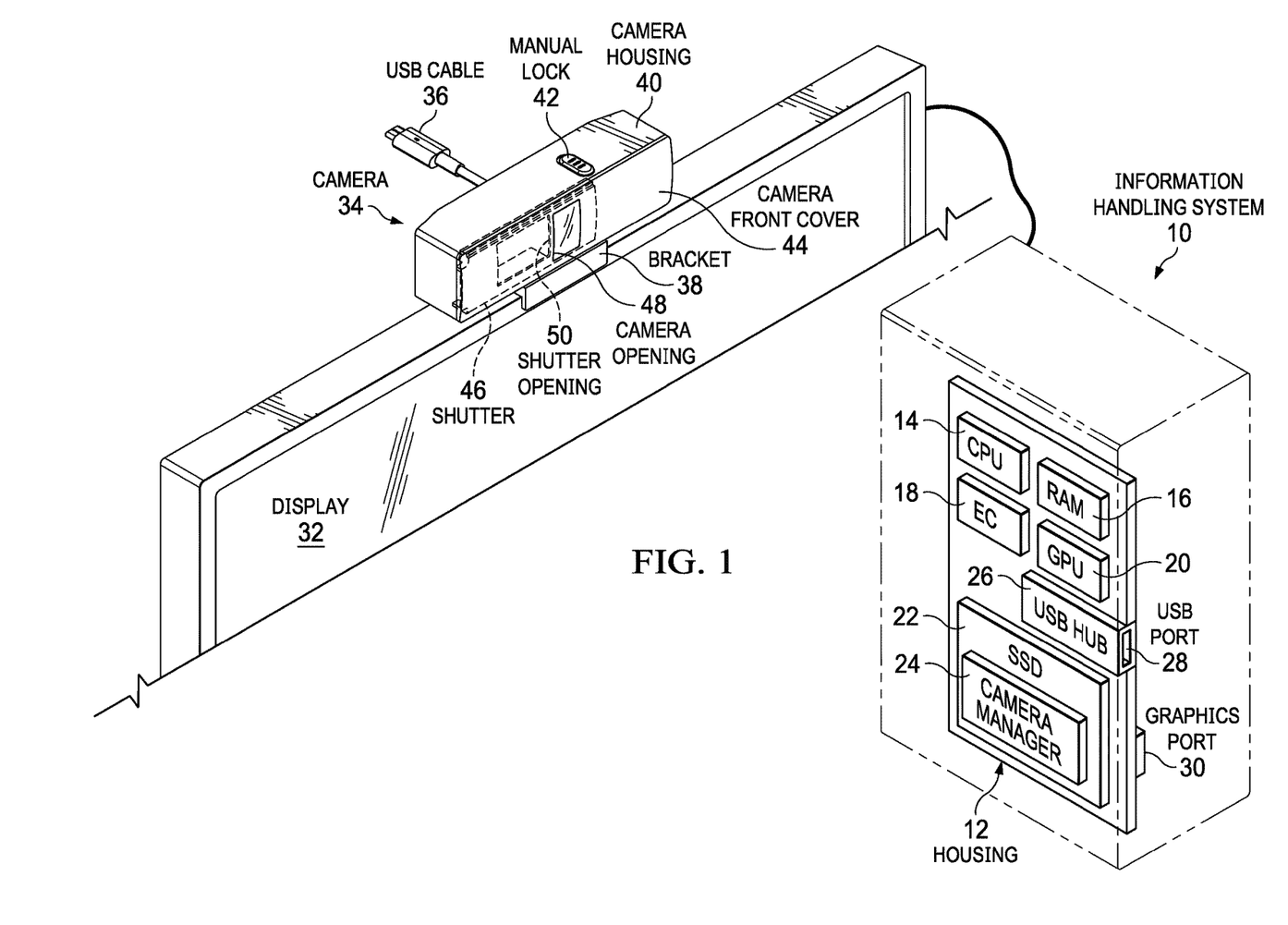
FIGS. 1, 1A, 1B and 1C depict an information handling system for interfacing with a camera having automated tilt, pan and shutter functionality.

Referring now to FIG. 1, an information handling system 10 is depicted interfacing with a camera 34 having automated tilt, pan and shutter functionality. In the example embodiment, information handling system 10 processes information with processing components disposed in a housing 12. A central processing unit (CPU) 14 executes instructions to process information with the instructions stored for access by CPU 14 in a random access memory (RAM) 16. An embedded controller 18 interfaces with CPU 14 and manages system physical operations, such as application of power, maintenance of thermal constraints and interactions with input devices like a keyboard and mouse. A graphics processing unit (GPU) 20 interfaces with CPU 14 to further process information and generate pixel values that define visual images for presentation at a display 32. A solid state drive (SSD) 22 provides non-transient memory, such as flash memory, that stores the instructions and information during system power down periods. For instance, an operating system and applications stored in SSD 22 are retrieved to RAM 16 at power up for execution by CPU 14. In the example embodiment, display 32 is a peripheral display coupled through a graphics port 30 to present the information as visual images. A camera 34 couples to display 32 with a bracket 38 and interfaces through a USB cable 36 and USB port 28 to a USB hub 26 of information handling system 10, such as to communication visual images captured at camera 34 for presentation at display 32.

Camera 34 integrates mechanisms to automatically adjust pan tilt and shutter functionality. In the example embodiment, FIG. 1 depicts camera 34 in an off state having alignment with a central axis and a shutter 46 closed to block a view of a camera module disposed in the interior of a camera housing 40. In the depicted closed shutter configuration, shutter 46 is slid relative to a camera front cover 44 so that a camera opening 48 of front cover 44 is blocked by shutter 46. A manual lock 42 at the upper side of camera housing 40 can be slid against shutter 46 within the interior of camera housing 40 to prevent sliding of shutter 46 relative to front cover 44. When an end user desires to capture visual images, shutter 46 is slid relative to front cover 44 to align a shutter opening 50 with camera opening 48 to expose the camera from within the interior of camera housing 40.

Figure 1A:
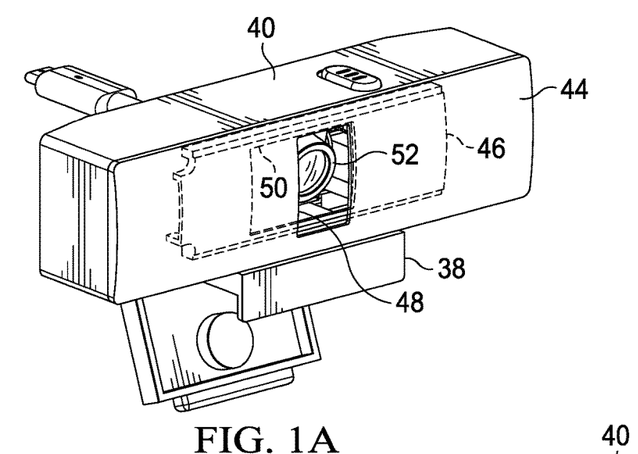
Figure 1B:
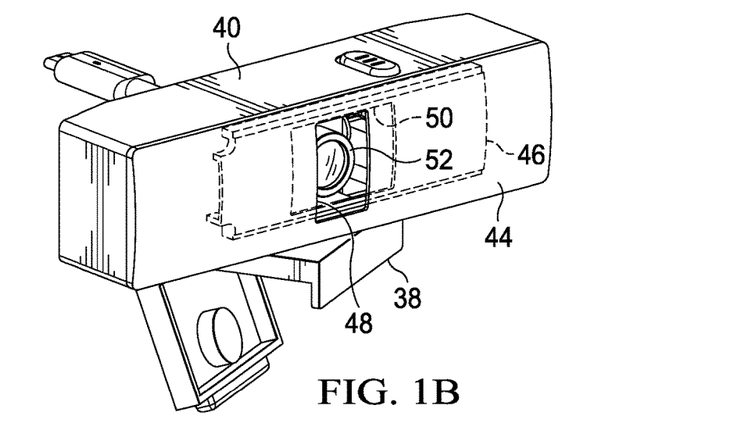
Figure 1C:
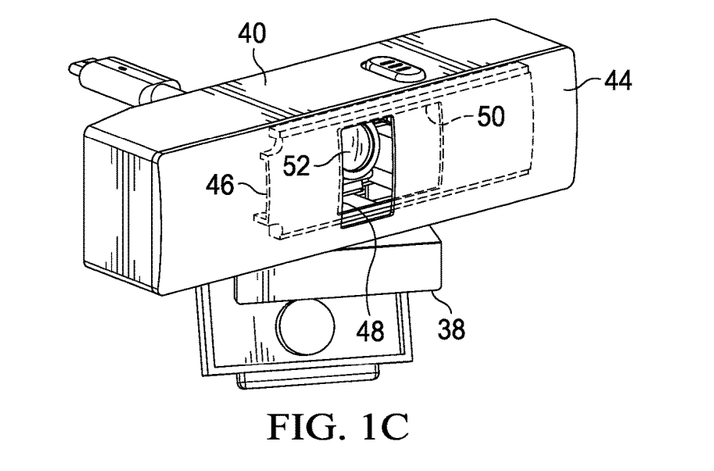

Referring now to FIGS. 1A, 1B and 1C, the operation of pan, tilt and shutter functionality is depicted. In FIG. 1A, an internal shutter translation mechanism has slid shutter 46 relative to front cover 44 to align an initial portion of shutter opening 50 with camera opening 48 and expose a camera module 52. As is illustrated by the outline of shutter opening 50, the dimensions of shutter opening 50 along the sliding axis are larger than the dimensions of camera opening 48 so that continued sliding of shutter 46 will maintain exposure of camera module 52 through front cover opening 48. When shutter 50 initially exposes camera module 52, the camera field of view is directed in a full down alignment. Once camera module 52 is fully exposed, an internal sensor provides power that allows capture of images, such as by sensing the position of shutter 46. In the example embodiment, sliding movement of shutter 46 translates to camera module 52 to adjust the vertical alignment of camera module 52 for a tilt of the camera field of view. For example, a camera manager 24 executed on information handling system 10 detects an end user position in the field of view and slides shutter 46 to tilt camera module 52 thereby centering the end user.

FIG. 1B depicts an adjustment of the tilt and pan of camera 34, such as to adjust the camera field of view to capture an end user off center from the central axis of camera 34. The tilt orientation of camera module 52 is at a midway axis with the tilt adjusted by sliding shutter 46 so that shutter opening 50 is centered under front cover opening 48. Motion of shutter 46 to the central location is translated to rotate camera module 52 for rotation to a mid-level axis between a fully depressed field of view illustrated by FIG. 1A and a fully raised field of view illustrated by FIG. 1B. In FIG. 1B, the full raised tilt axis is accomplished by sliding shutter 46 to align the opposite side of shutter opening 50 at the edge of camera opening 48. FIGS. 1A and 1B depict an example of camera pan rotation between full right and full left axes. Camera pan is achieved with an internal housing rotation mechanism that operates against a gear coupled to bracket 38, as described in greater detail below.

Figure 2:
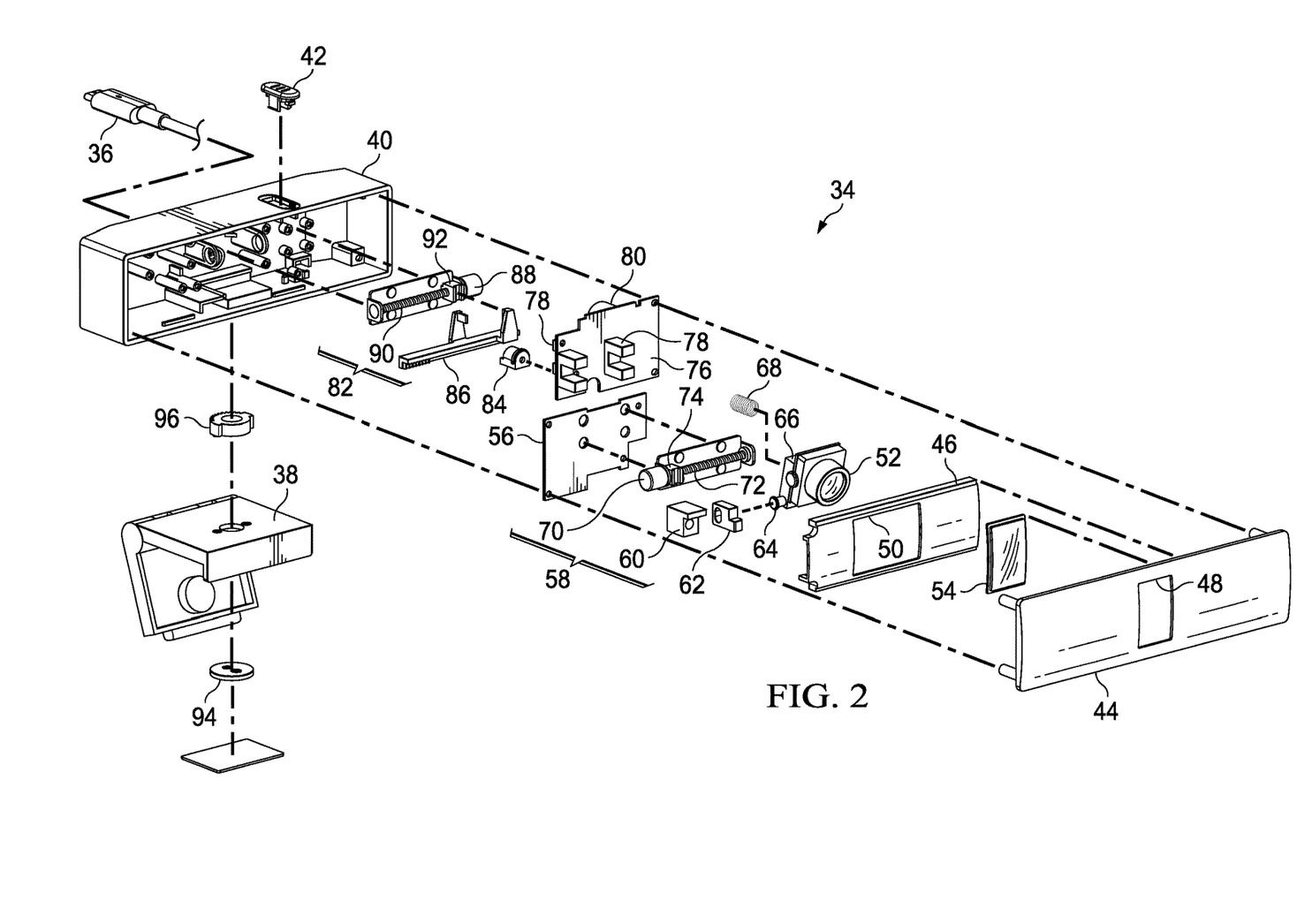
FIG. 2 depicts an exploded perspective view of camera pan, tilt and shutter mechanisms disposed in the camera interior.

Referring now to FIG. 2, an exploded perspective view of camera 34 depicts pan, tilt and shutter mechanisms disposed in the camera interior. Front cover 44 has a camera opening 48 aligned with camera module 52 to allow capture of images when shutter 46 slides to align shutter opening 50 with camera opening 48. A clear window 54 inserts into camera opening 48 to protect the camera interior. Camera module 52 mounts to a camera holder 66 that rotationally couples relative to a left-side printed circuit board 56. In the example embodiment, camera holder 66 extends a member 64 into a swivel pin 62 that rotates relative to a fixed swivel pin support 60. A shutter translation mechanism 58 couples to left printed circuit board 56 and engages shutter 46 to slide shutter 46 relative to front cover 44. Shutter translation mechanism 58 includes a threaded member 72 engaged with a shutter coupling member 74 that moves along the length of threaded member 72 when threaded member 72 is rotated by a stepper motor 70. Shutter coupling member 74 couples at a fixed location of shutter 46 to slide shutter 46 relative to front cover 44. As shutter 46 slides, a cam surface interacts with swivel pin 62 to change a tilt angle of camera holder 66. A spring 68 biases against camera holder 66 towards a full up tilt orientation. Position sensors 78, such as transmissive photo interrupters, detect a relative position of shutter 46, such as by an interruption related to a member of shutter 46 that extends into the interior of camera housing 40. For instance, sensors 78 may detect shutter full closed and full open positions as well as intermediate positions, such as initial alignment of camera opening 48 and shutter opening 50 at which power is applied to camera module 52.

Pan of camera 34 is managed by a housing rotation mechanism 82 coupled to a rear side of camera housing 40 and a right side printed circuit board 76. Housing rotation mechanism 82 includes a threaded member 90 engaged with a coupling device 92 that moves along the length of threaded member 90 when rotated by a stepper motor 88. Coupling member 92 engages a pan bar 86 having gear teeth along its length that engage with a pivot gear 96 held in place at bracket 38 by a cover disc 94. Pan bar 86 slides along a pan bar support 84 so that lateral sliding motion translates against pivot gear 96 to rotate camera housing 40. A position sensor 78, such as a transmissive photo interrupter, detects a central position of pan bar 86 with a member extending from pan bar 86 to the plane of the sensor that passes through the sensor at a central orientation. Pivot gear 96 includes extensions that limit the rotation of camera housing 40. A super capacitor 80 interfaces with stepper motor 88 to provide current for stepper motor 88 to re-center pan bar 86 in the event that power is cut off from camera 34 when panned off the central axis.

Figure 3A:
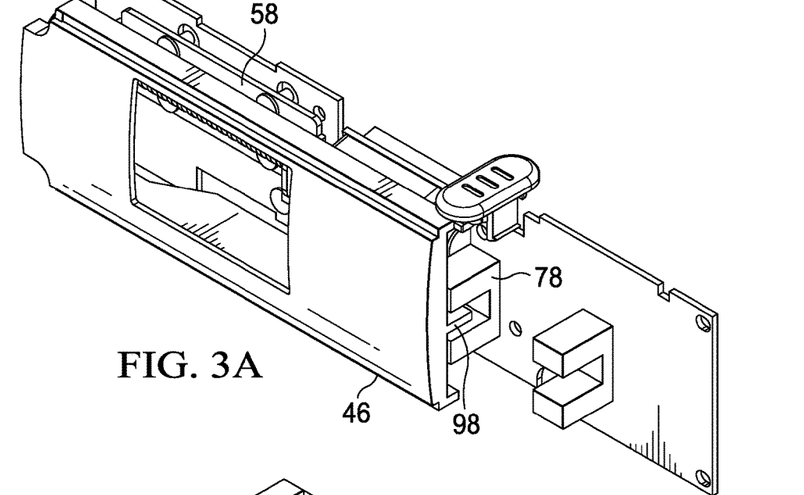
FIGS. 3A, 3B and 3C depict a shutter slid to a closed position having the camera module alignment full down.
Figure 3B:
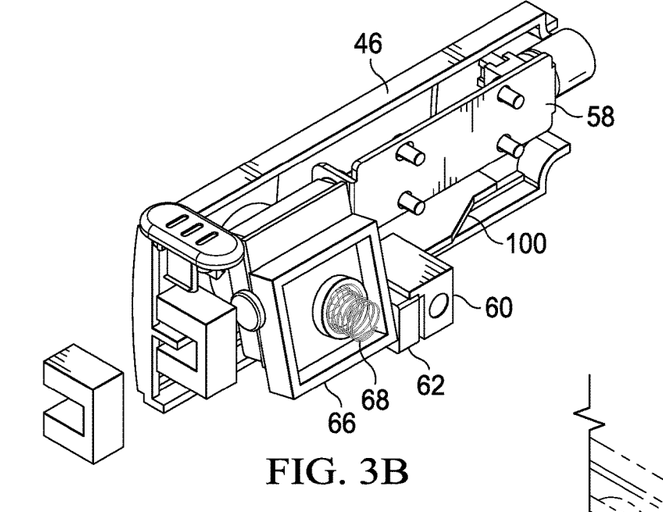
Figure 3C:
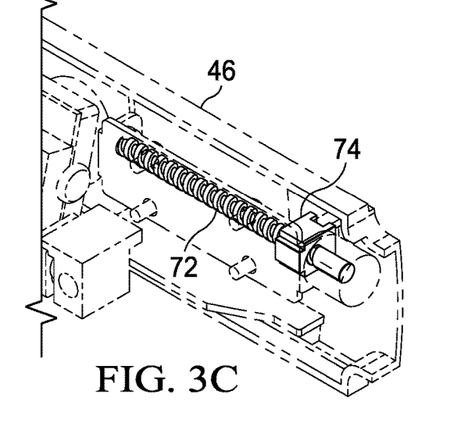

Referring now to FIGS. 3A, 3B and 3C, a shutter 46 is depicted slid to a closed position having the camera module alignment tilt full down. FIG. 3A depicts a front perspective view that illustrates sensor 78 detecting a member 98 extending from shutter 46 to determine a full closed actuation of shutter translation mechanism 58. FIG. 3B depicts a rear perspective view that illustrates the position of camera holder 66 to place the camera module behind shutter 46, thereby obstructing its field of view. Swivel pin support 60 holds swivel pin 62 in place against a raised portion of a cam 100 extending out from shutter 46 and thereby compressing spring 68. Cam 100 aligns camera holder 66 in a full down tilt axis. FIG. 3C depicts a transparent front view that illustrates a position of coupling member 74 that holds shutter 46 in the closed position based upon movement generated as a result of rotation of threaded member 72 by the stepper motor.

Figure 4A:
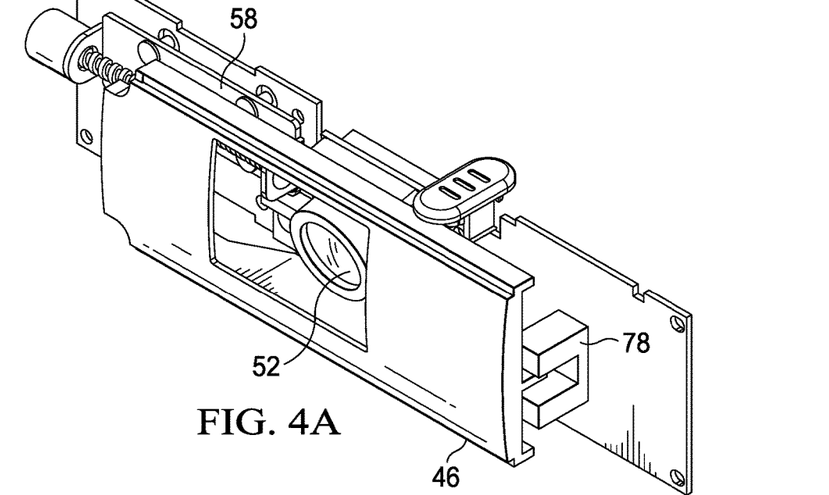
FIGS. 4A, 4B and 4C depict a shutter slid to an open position having the camera module alignment full down.
Figure 4B:
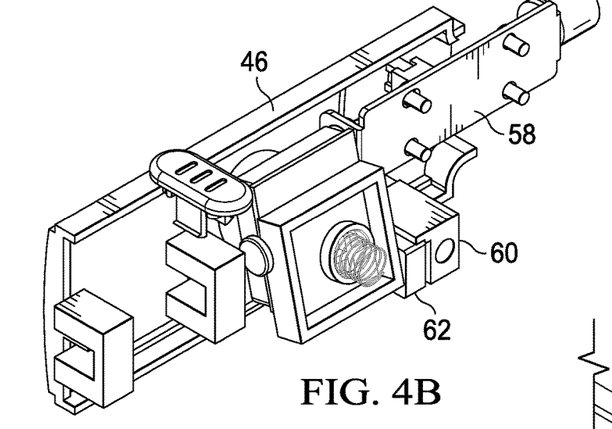
Figure 4C:
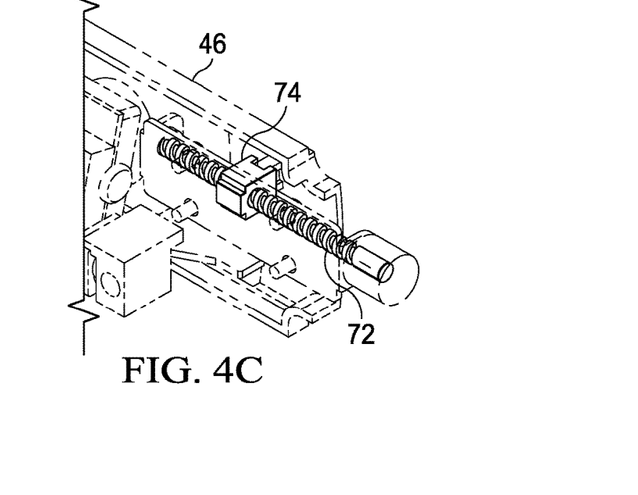

Referring now to FIGS. 4A, 4B and 4C, a shutter 46 is depicted slid to an open position having the camera module 52 alignment full down. FIG. 4A depicts a front perspective having shutter 46 slid to align shutter opening 50 with camera module 52 to support capture of visual images. The second sensor 78 detects passage of the member extending from shutter 46 so that camera module 52 can power up when the camera obtains a field of view. FIG. 4B shows the relative shift leftward of shutter 46 from the fixed position of shutter translation mechanism 58 so that camera module 52 aligns with shutter opening 50. FIG. 4C illustrates that swivel pin 62 has moved to the edge of the inclination of cam 100 so that camera module 52 remains oriented in a full down tilt orientation. Coupling member 74 has moved along threaded member 72 with a remaining portion of movement available to change the tilt of camera module 52 by sliding swivel pin 62 along the inclined surface of cam 100 so that spring 68 can bias camera holder 66 to an upward tilt orientation.

Figure 5A:
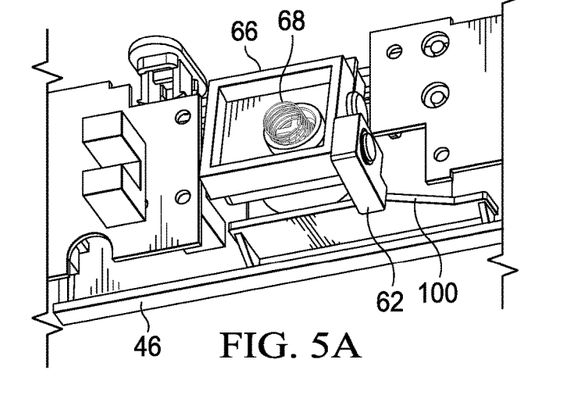
FIGS. 5A, 5B, 5C and 5D depict the camera module interaction with the shutter cam surface to adjust the camera tilt orientation.
Figure 5B:
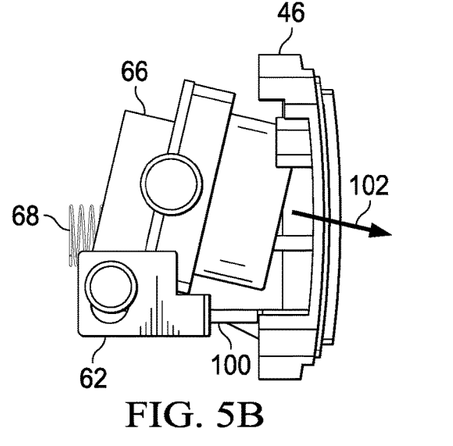
Figure 5C:
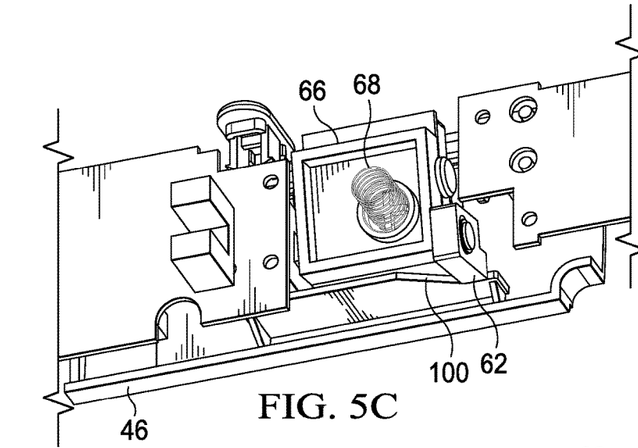
Figure 5D:
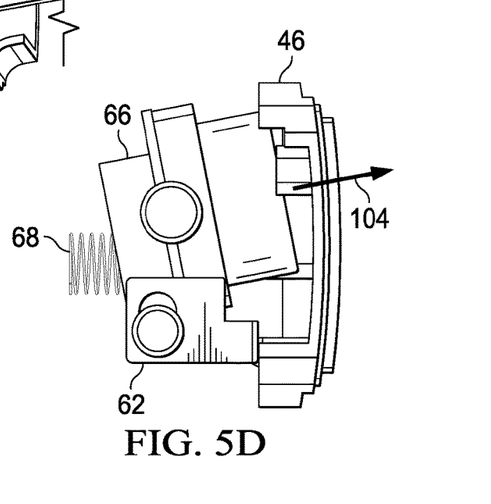

Referring now to FIGS. 5A, 5B, 5C and 5D, the camera module 52 interaction with the shutter 46 cam surface 100 to adjust the camera tilt orientation is depicted. FIG. 5A depicts a lower perspective view of camera holder 66 pushed to an upward tilt position that compresses spring 68 by engagement of swivel pin 62. FIG. 5B depicts a side view of the position illustrated by FIG. 5A with camera module 52 having a full down tilt orientation 102. The downward tilt orientation is accomplished by a rearward position of swivel pin 62 based upon its engagement with cam 100. FIG. 5C depicts a lower perspective view of camera holder 66 biased to a full upward tilt orientation as spring 68 pushes forward on camera holder 66 and swivel pin 62 is allowed forward motion by the incline of cam 100. FIG. 5D illustrates that the forward motion of swivel pin 62 against cam 100 allows rotation of camera holder 66 to the upward axis 104. Between the full downward tilt axis 102 and the full upward tilt axis 104, an intermediate tilt orientation is selected by movement of swivel pin 62 along the length of cam 100 with the shutter translation mechanism. For instance, an application executing on an information handling system commands the shutter translation mechanism to adjust its lateral position so that the desired tilt is accomplished.

Figure 6:
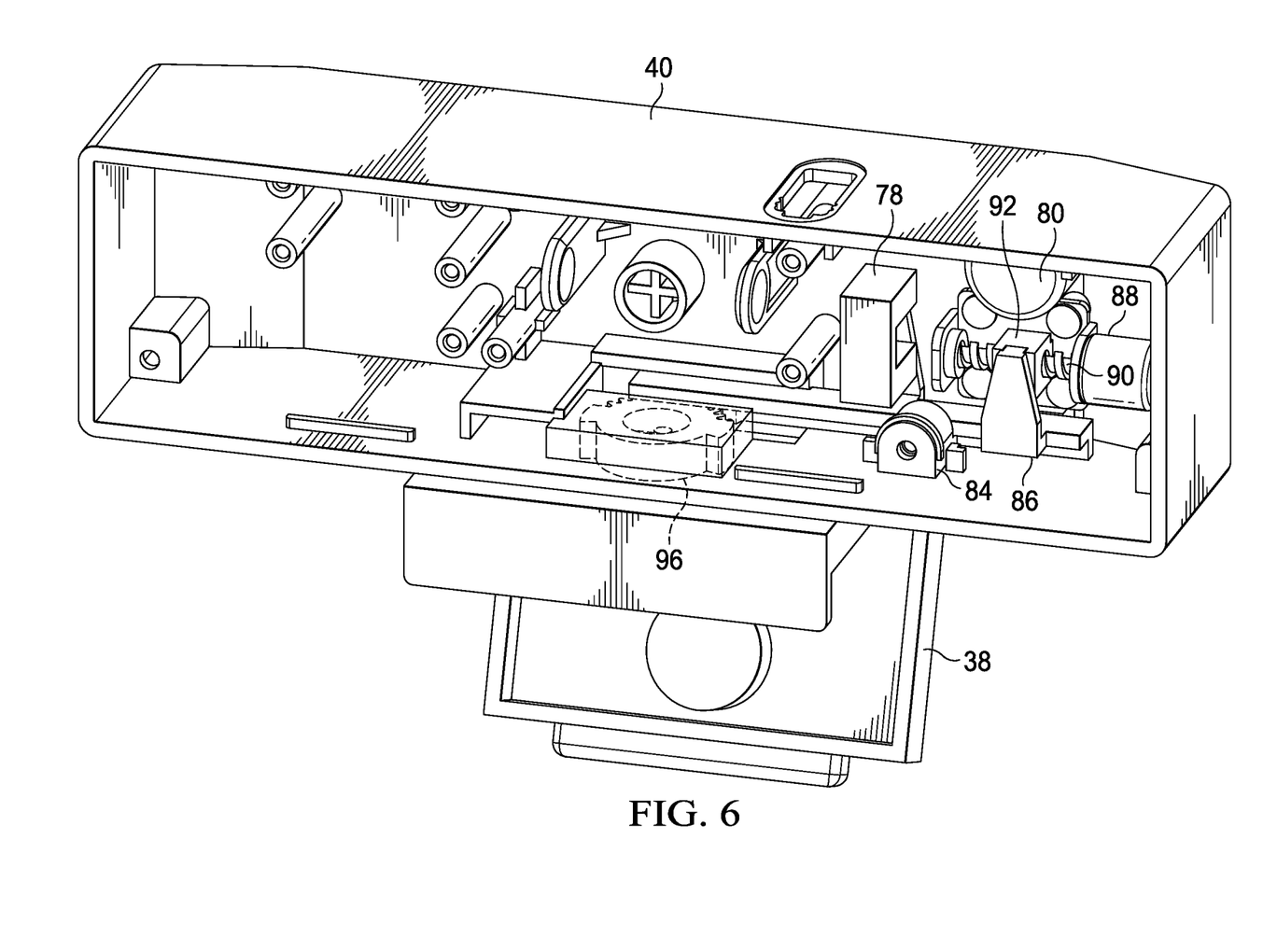
FIG. 6 depicts a rear view of the housing rotation mechanism interfaced at a pivot gear of the bracket.

Referring now to FIG. 6, a rear view depicts the housing rotation mechanism 82 interfaced at a pivot gear 96 of the bracket 38. Pan bar 86 has gears exposed at the side surface that is engaged with gears of pivot gear 96 so that a lateral movement of pan bar 86 translates into rotation of camera housing 40. A position sensor 78 detects a central orientation by reference to a member extending up from pan bar 86. Stepper motor 88 rotates threaded member 90 to move coupling device 92 along its length. Movement of coupling device 92 translates to pan bar 86, which is held in position by pan bar holder 84 to provide lateral movement. An application on an information handling system may pan camera housing 40 in desired directions, such as to center on an end user, by commanding rotation of step motor 88. Supercapacitor 80 provides power to step motor 88 and position sensor 78 so that camera housing 40 may be automatically commanded to a central axis in the event that power to the camera is turned off. In the example embodiment, camera housing 40 rests on a bracket configured to couple to a display, however, in alternative embodiments, camera housing 40 may couple to a stand, such as that rests on a desktop surface.

Figure 7A:
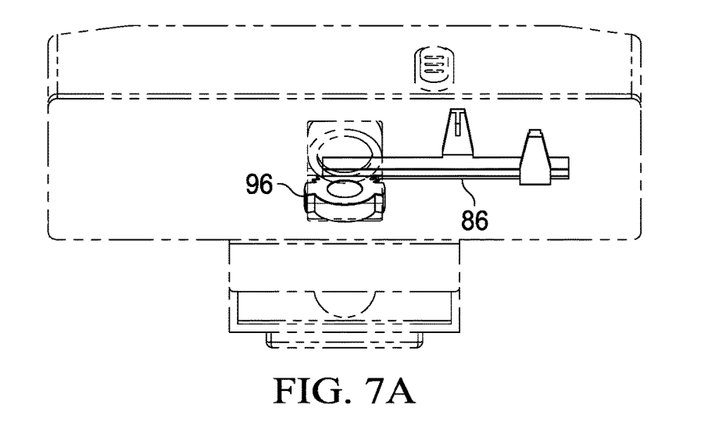
FIGS. 7A, 7B and 7C depict alignments of the pan bar and pivot gear that achieve camera housing rotation.
Figure 7B:
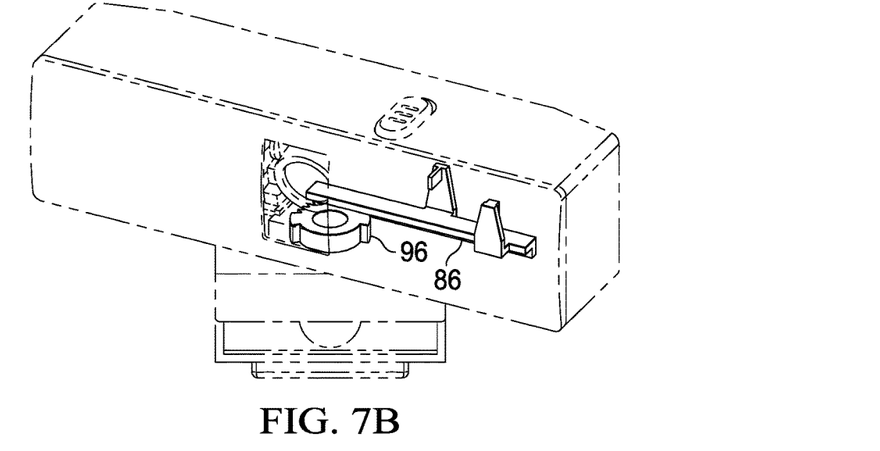
Figure 7C:
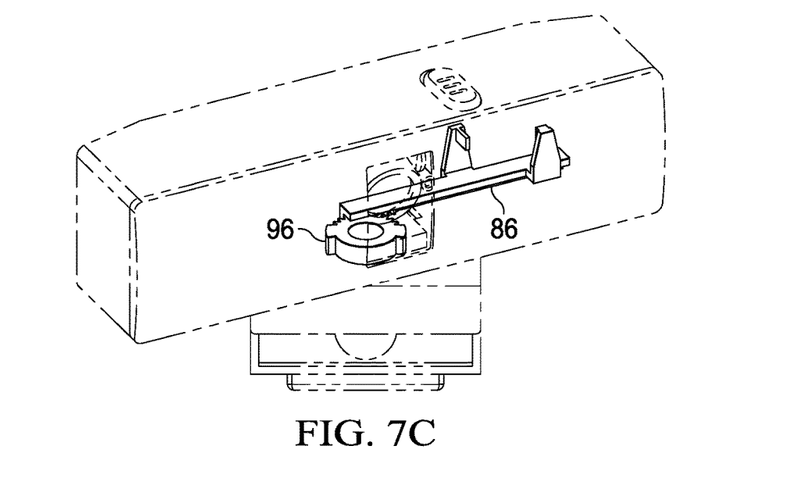

Referring now to FIGS. 7A, 7B and 7C, alignments of the pan bar 86 and pivot gear 96 that achieve camera housing rotation are depicted. FIG. 7A depicts pan bar 86 and pivot gear 96 in a central location having the stepper motor driving the coupling device to a center location on the threaded member. FIG. 7B depicts a pan right accomplished by driving the coupling device to a full left position with the stepper motor to translate motion of pan bar 86 into rotation right of the camera housing. FIG. 7C depicts a pan left accomplished by driving the coupling device to a full right position with the stepper motor to translate motion of pan bar 86 into rotation left of the camera housing.

Although the present invention has been described in detail, it should be understood that various changes, substitutions and alterations can be made hereto without departing from the spirit and scope of the invention as defined by the appended claims.

What is claimed is:

1. An information handling system comprising:
   a housing;
   a processor disposed in the housing an operable to execute instructions that process information;
   a memory interfaced with the processor and operable to store the instructions and information;
   a display interfaced with the processor and operable to present the information as visual images; and
   a camera configured to couple to the display, the camera comprising:
   a camera housing having an interior;
   a camera module disposed in the interior and operable to capture visual images for communication to the processor and presentation at the display;
   a cover coupled over the camera housing and having a cover opening of a first dimension, the cover opening aligned with the camera module;
   a shutter coupled to the cover in the interior and having a shutter opening of a second dimension, the second dimension greater than the first dimension, the shutter having a sliding engagement with the cover and a cam disposed proximate the camera module; and
   a shutter translation mechanism coupled to the shutter and operable to slide the shutter relative to the front cover and camera module, the camera module oriented along a downward axis until exposed through the shutter opening at a first shutter position, the camera module interfaced with the cam at the first shutter position to a second shutter position, the cam rotating the camera module to an upward orientation.

2. The information handling system of claim 1 further comprising:
   non-transient memory interfaced with the processor and storing instructions that when executed on the processor:
   detect an end user image in the camera module visual image; and
   command the shutter translation mechanism to slide to a position that adjusts the shutter between the downward orientation and upward orientation to vertically center the end user image.

3. The information handling system of claim 1 wherein the shutter translation mechanism comprises:
   a threaded member;
   a coupling member engaged on the threaded member and coupled to the shutter, the coupling member moving in response to rotation of the threaded member; and
   a stepper motor engaged with the threaded member to rotate the threaded member.

4. The information handling system of claim 3 further comprising a spring engaged against the camera module to bias the camera to the upward orientation.

5. The information handling system of claim 3 further comprising a sensor aligned to detect the first shutter position and interfaced with the camera module, the camera module disabled from capturing visual images until the shutter slides to at least the first position.

6. The information handling system of claim 1 further comprising:
   a bracket coupled to the camera housing and operable to couple the camera housing to the display;
   a pivot gear rotationally coupling the bracket and the camera housing; and
   a housing rotation mechanism disposed in the camera housing and interfaced with the pivot gear to rotate the camera housing about the pivot gear.

7. The information handling system of claim 6 further comprising:
   non-transient memory interfaced with the processor and storing instructions that when executed on the processor:
   detect an end user image in the camera module visual image; and
   command the housing rotation mechanism to rotate the camera housing to horizontally center the end user image.

8. The information handling system of claim 7 wherein the housing rotation member comprises:
   a threaded member;
   a pan bar having gears engaged with the pivot gear;
   a coupling member engaged on the threaded member and coupled to the pan bar, the coupling member moving the pan bar in response to rotation of the threaded member; and
   a stepper motor engaged with the threaded member to rotate the threaded member.

9. The information handling system of claim 8 further comprising a capacitor interfaced with the stepper motor, the capacitor providing power to center the pan bar in response to a predetermined condition.

10. A method for adjusting a camera, the method comprising:
    coupling a camera front cover having a first opening to a shutter having a second opening;
    aligning the camera with the first opening;
    sliding the shutter from a first position having the shutter blocking the first opening to a second position having the first opening aligned with the second opening and the camera tilted to a first axis;
    sliding the shutter from the second position to a third position having the first opening aligned with the second opening; and
    translating the sliding the shutter from the second position to the third position to tilt the camera from the first axis to a second axis.

11. The method of claim 10 wherein the translating the sliding further comprises:
    biasing the camera towards the second axis with a spring; and
    releasing the biasing during the translating with a cam surface interfaced with the camera.

12. The method of claim 11 further comprising:
    rotating a threaded member with a motor;
    moving a coupling member along the threaded member by engagement of the coupling member with threads of the threaded member; and
    translating the moving the coupling member to slide the shutter.

13. The method of claim 11 further comprising:
    sensing a position of the second opening relative to the first opening; and enabling and disabling the camera from capturing images based upon the sensing.

14. The method of claim 10 further comprising:
rotationally coupling a camera body to a camera bracket with a pivot gear;
engaging gears of a pan bar disposed in the camera body to gears of the pivot gear;
engaging a coupling member to the pan bar and to a motor; and
rotating the camera body relative to the bracket by moving the coupling member with the motor.

15. The method of claim 10 further comprising:
detecting removal of power at the camera; and
in response to the detecting, applying power from a capacitor to the motor to rotate the camera housing to a neutral position.

16. A camera comprising:
a camera housing having an interior;
a camera module disposed in the interior and operable to capture visual images;
a cover coupled over the camera housing and having a cover opening aligned with the camera module;
a shutter coupled to the cover in the interior and having a shutter opening, the shutter having a sliding engagement with the cover and a cam disposed proximate the camera module; and
a shutter translation mechanism coupled to the shutter and operable to slide the shutter relative to the front cover and camera module, the camera module oriented along a first axis until exposed through the shutter opening at a first shutter position, the camera module interfaced with the cam at the first shutter position to a second shutter position, the cam rotating the camera module to a second orientation in response to movement to the second shutter position.

17. The camera of claim 16 further comprising:
a bracket coupled to the camera housing;
a pivot gear rotationally coupling the bracket and the camera housing; and
a housing rotation mechanism disposed in the camera housing and interfaced with the pivot gear to rotate the camera housing about the pivot gear.

18. The camera of claim 17 wherein the shutter translation mechanism comprises:
a threaded member;
a coupling member engaged on the threaded member and coupled to the shutter, the coupling member moving in response to rotation of the threaded member; and
a motor engaged with the threaded member to rotate the threaded member.

19. The camera of claim 18 wherein the housing rotation member comprises:
a threaded member;
a pan bar having gears engaged with the pivot gear;
a coupling member engaged on the threaded member and coupled to the pan bar, the coupling member moving the pan bar in response to rotation of the threaded member; and
a motor engaged with the threaded member to rotate the threaded member.

20. The camera of claim 19 further comprising a capacitor storing a charge to return the camera pan bar and shutter to a neutral position in the event of loss of power.

* * * * *